US012756074B2

(12) United States Patent
Yokoyama

(10) Patent No.: US 12,756,074 B2
(45) Date of Patent: Oct. 6, 2026

(54) BATTERY-CELL COUPLING STRUCTURE

(71) Applicant: SUBARU CORPORATION, Tokyo (JP)

(72) Inventor: Yutaka Yokoyama, Tokyo (JP)

(73) Assignee: Subaru Corporation, Tokyo (JP)

(*) Notice: Subject to any disclaimer, the term of this patent is extended or adjusted under 35 U.S.C. 154(b) by 517 days.

(21) Appl. No.: 18/519,869

(22) Filed: Nov. 27, 2023

(65) Prior Publication Data

US 2024/0213627 A1 Jun. 27, 2024

(30) Foreign Application Priority Data

Dec. 21, 2022 (JP) ................................ 2022-204732

(51) Int. Cl.
*H01M 50/509* (2021.01)
*H01M 50/209* (2021.01)
*H01M 50/264* (2021.01)

(52) U.S. Cl.
CPC ....... *H01M 50/509* (2021.01); *H01M 50/209* (2021.01); *H01M 50/264* (2021.01)

(58) Field of Classification Search
CPC .. H01M 50/209; H01M 50/264; H01M 50/50; H01M 50/503; H01M 50/509; H01M 50/516; H01M 50/51
See application file for complete search history.

(56) References Cited

U.S. PATENT DOCUMENTS

2014/0363728 A1* 12/2014 Nishikawa .......... H01M 50/503 429/160

FOREIGN PATENT DOCUMENTS

JP 2014-199716 A 10/2014

* cited by examiner

*Primary Examiner* — Brian R Ohara
*Assistant Examiner* — Brent C Thomas
(74) *Attorney, Agent, or Firm* — McGinn IP Law Group, PLLC

(57) ABSTRACT

A battery-cell coupling structure includes battery cells arranged in a first direction, a first electrode coupling plate including an insulating substrate and a first coupling terminal provided at a first end of the insulating substrate in a second direction orthogonal to the first direction, and a second electrode coupling plate including the insulating substrate, the first coupling terminal, and a second coupling terminal provided at a second end of the insulating substrate in the second direction. The battery-cell coupling structure is configured to electrically couple the battery cells to each other. Each of the battery cells includes a first electrode provided at a first end in the second direction and a second electrode provided at a second end in the second direction. The battery cells are coupled in series, parallel, or series-parallel with one or both of the first electrode coupling plate and the second electrode coupling plate.

7 Claims, 7 Drawing Sheets

BATTERY-CELL COUPLING STRUCTURE

CROSS-REFERENCE TO RELATED APPLICATIONS

The present application claims priority from Japanese Patent Application No. 2022-204732 filed on Dec. 21, 2022, the entire contents of which are hereby incorporated by reference.

BACKGROUND

The disclosure relates to a battery-cell coupling structure.

A known battery pack structure is disclosed in, for example, Japanese Unexamined Patent Application Publication (JP-A) No. 2014-199716.

Battery packs, which are formed of multiple battery cells stored in a case so as to be able to output a predetermined voltage and capacity, are widely used as power sources of various devices, vehicles, and the like. Multiple battery cells are stored in a case of a battery module constituting a battery pack, and a positive electrode terminal and a negative electrode terminal are provided on a first side surface of the case. Inside the case, the battery cells are coupled in series, parallel, or series-parallel via bus bars.

Such battery modules are stacked in, for example, three layers and are coupled and fixed to one another via a bracket, and the positive electrode terminals and the negative electrode terminals are electrically coupled to one another via bus bars. As described above, various shapes of bus bars are prepared according to a predetermined voltage or the like of the battery pack, and the battery modules are electrically coupled to one another via the bus bars.

SUMMARY

An aspect of the disclosure provides a battery-cell coupling structure including battery cells, a first electrode coupling plate, and a second electrode coupling plate. The battery cells are arranged in a first direction. The first electrode coupling plate includes an insulating substrate and a first coupling terminal provided at a first end of the insulating substrate in a second direction orthogonal to the first direction. The second electrode coupling plate includes the insulating substrate, the first coupling terminal, and a second coupling terminal provided at a second end of the insulating substrate in the second direction. The battery-cell coupling structure is configured to electrically couple the battery cells to each other. Each of the battery cells includes a first electrode provided at a first end in the second direction and a second electrode provided at a second end in the second direction. The first electrode coupling plate is disposed between the battery cells adjacent to each other in the first direction to couple the battery cells in series. The second electrode coupling plate is disposed between the battery cells adjacent to each other in the first direction to couple the battery cells in parallel. The battery cells are coupled in series, parallel, or series-parallel with one or both of the first electrode coupling plate and the second electrode coupling plate.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
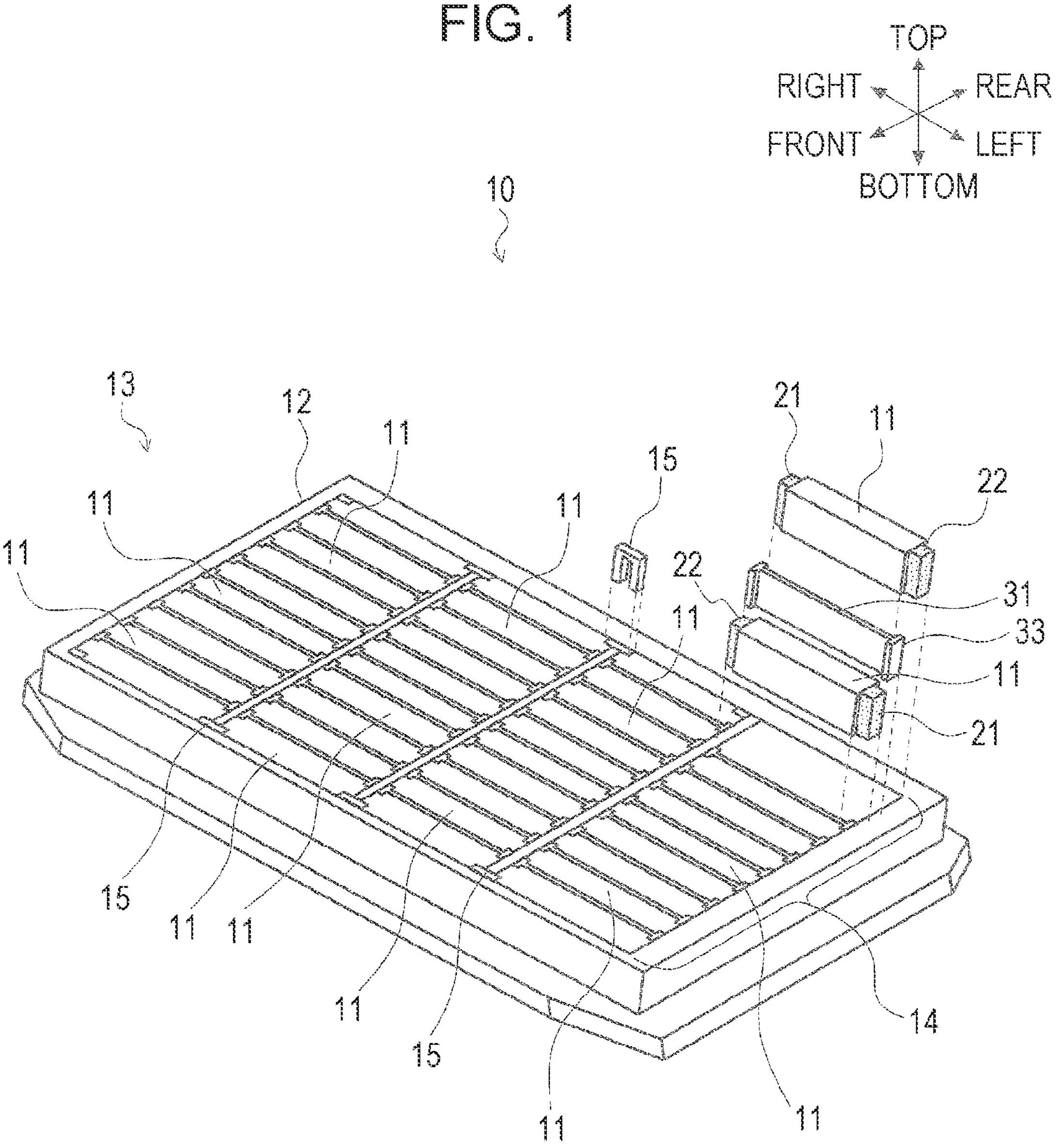
FIG. 1 is a perspective view of a battery pack including a battery-cell coupling structure according to an embodiment of the disclosure.

In the battery pack described in JP-A No. 2014-199716, the shapes of the bus bars are changed each time, for example, the number of the battery modules stored in the battery pack, the layout of the battery modules, or the method of coupling the battery modules is changed. This leads to a problem in that it is difficult to reduce the manufacturing cost, such as the die cost for manufacturing the bus bars.

In addition, when the conventional battery pack is used in an apparatus, such as an electric automobile, that uses a large number of battery modules, there are numerous coupling points with bus bars. Hence, the task of coupling the bus bars and the positive and negative electrode terminals by welding or the like is performed many times, making the task complex. Similarly, there also is a task of coupling and fixing the battery modules in the battery pack to one another, making the task complex.

It is desirable to provide a battery-cell coupling structure capable of coupling, in series, parallel, or series-parallel, multiple battery cells arranged at least in one direction with two types of electrode coupling plates.

A coupling structure 10 for battery cells 11 according to an embodiment of the disclosure will be described in detail below with reference to the drawings. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. The front-rear direction in the drawings corresponds to the thickness direction of the battery cells 11, the left-right direction in the drawings corresponds to the transverse width direction of the battery cells 11, and the top-bottom direction in the drawings corresponds to the height direction of the battery cells 11. The front-rear direction is the direction in which the battery cells 11 are arranged (arrangement direction) and corresponds to a first direction in the disclosure. The left-right direction corresponds to a second direction in the disclosure.

Figure 2:
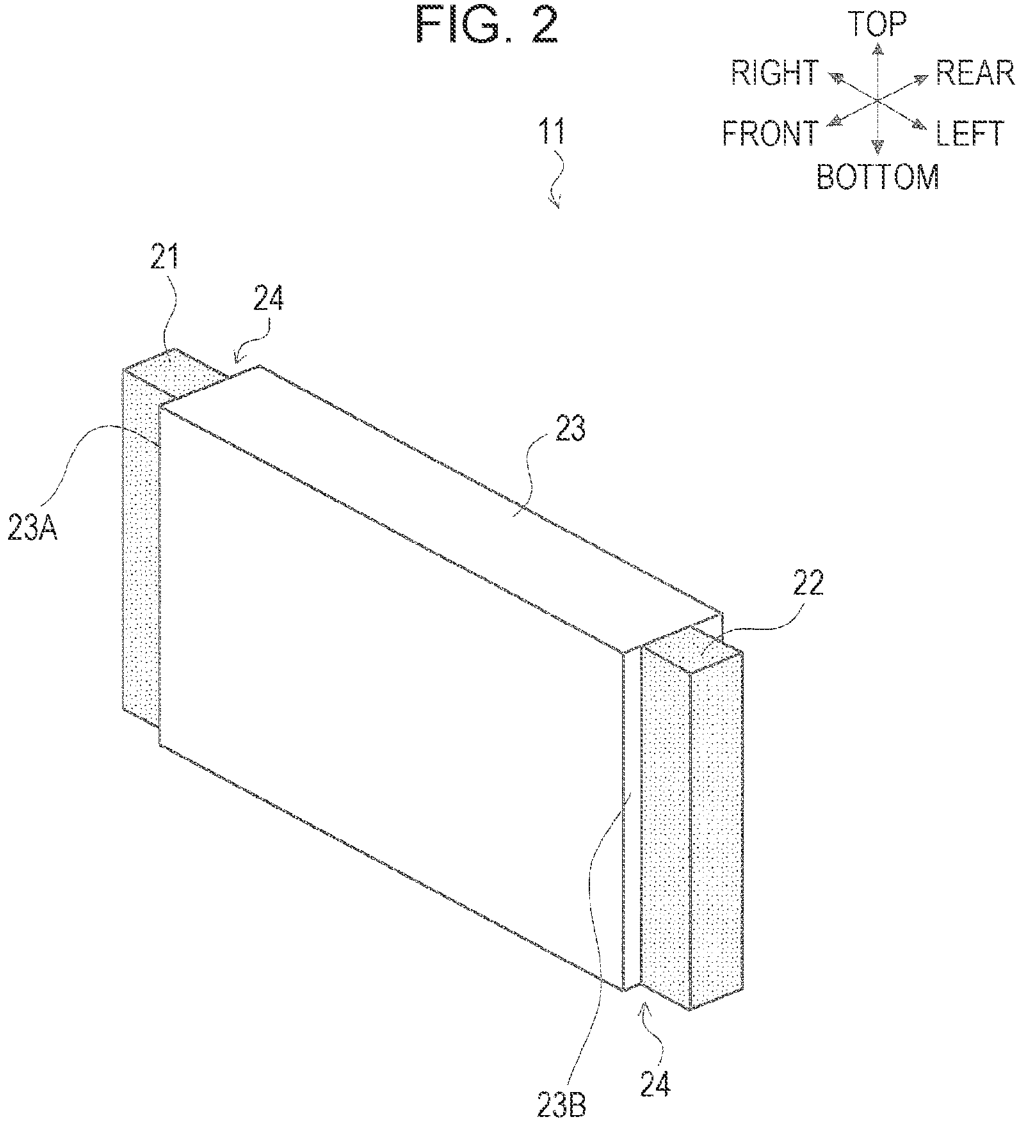
FIG. 2 is a perspective view of a battery cell used in the battery-cell coupling structure according to the embodiment of the disclosure.
Figure 3A:
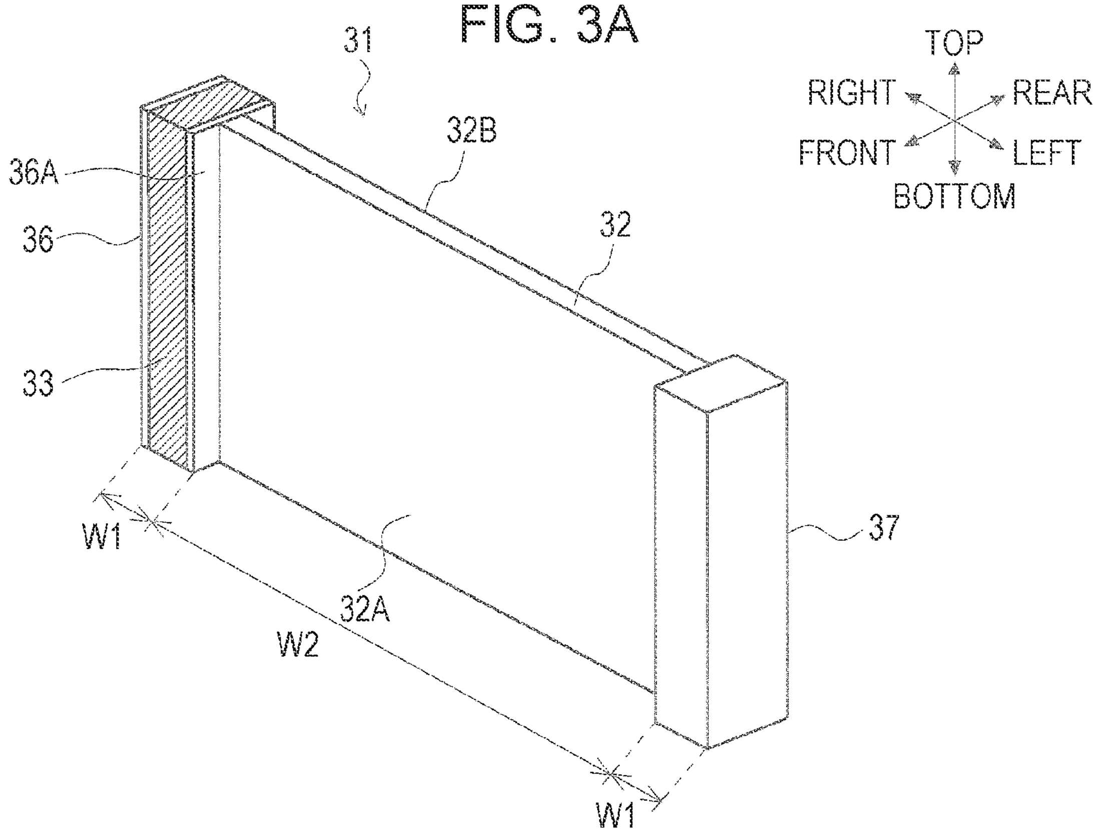
FIG. 3A is a perspective view of an electrode coupling plate used in the battery-cell coupling structure according to the embodiment of the disclosure.
Figure 3B:
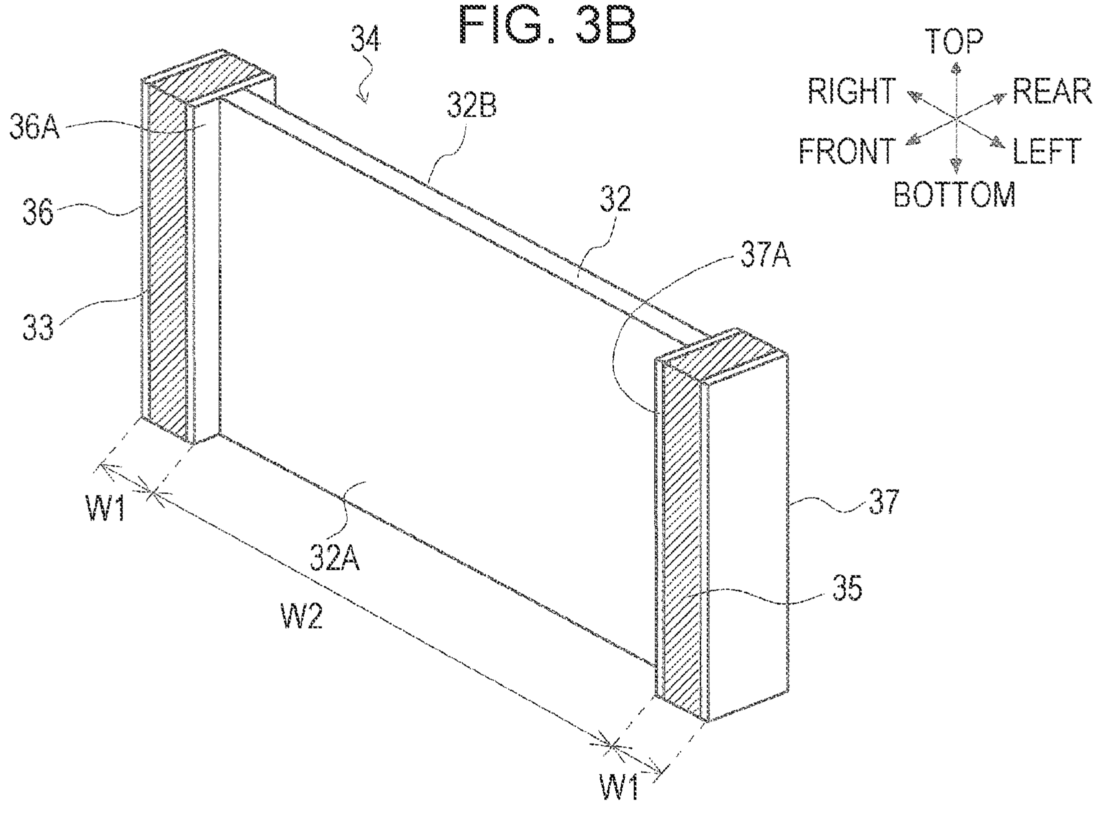
FIG. 3B is a perspective view of an electrode coupling plate used in the battery-cell coupling structure according to the embodiment of the disclosure.
Figure 4:
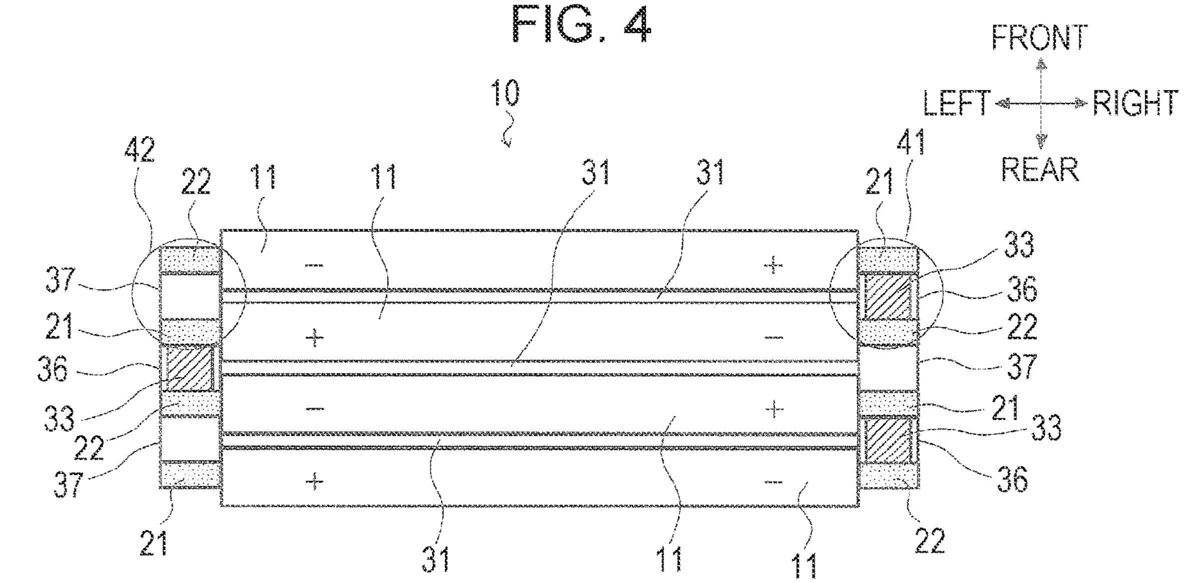
FIG. 4 is a top view of the battery-cell coupling structure according to the embodiment of the disclosure.
Figure 5:
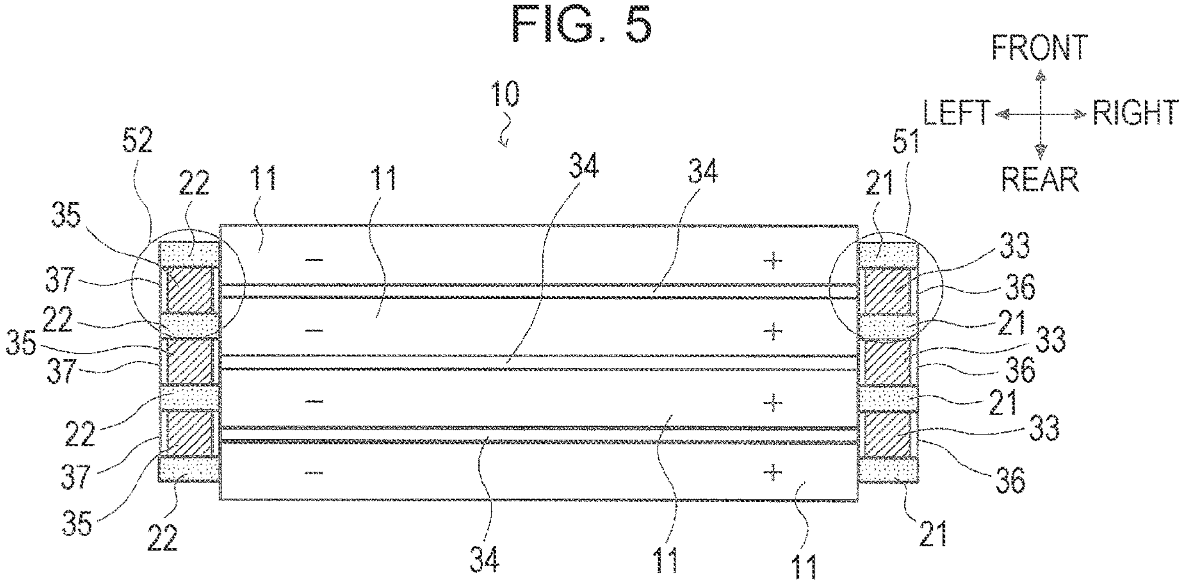
FIG. 5 is a top view of the battery-cell coupling structure according to the embodiment of the disclosure.
Figure 6:
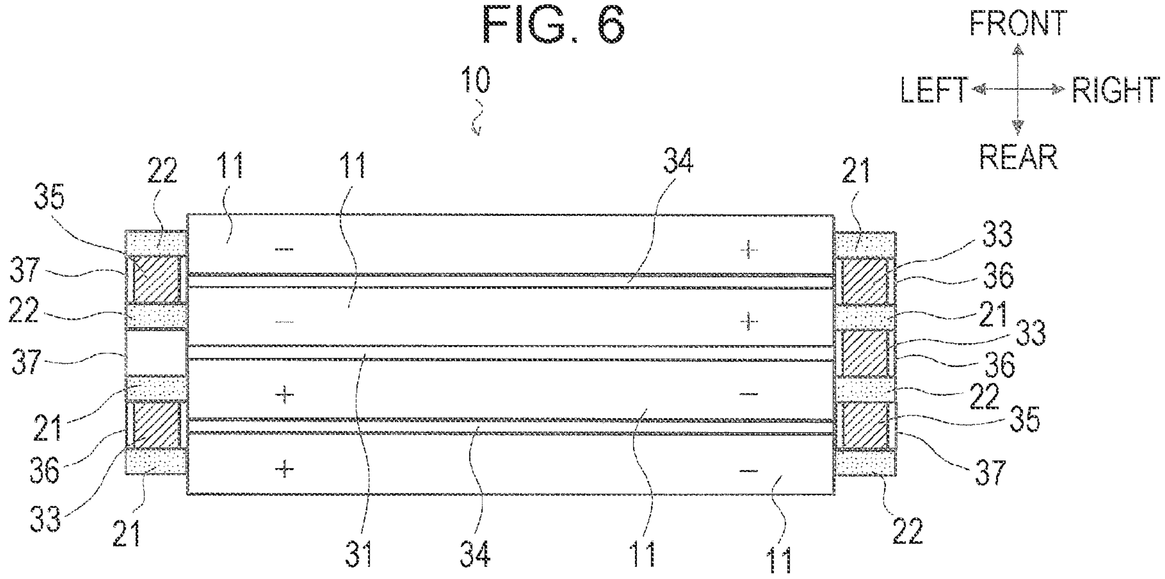
FIG. 6 is a top view of the battery-cell coupling structure according to the embodiment of the disclosure.

FIG. 1 is a perspective view of a battery pack 13 using the coupling structure 10 for the battery cells 11 according to this embodiment. FIG. 2 is a perspective view of a battery cell 11 used in the coupling structure 10 for the battery cells 11 according to this embodiment. FIG. 3A is a perspective view of a first electrode coupling plate 31 used in the coupling structure 10 for the battery cells 11 according to this embodiment. FIG. 3B is a perspective view of a second electrode coupling plate 34 used in the coupling structure 10 for the battery cells 11 according to this embodiment. FIGS. 4 to 6 are top views of the coupling structure 10 for the battery cells 11 according to this embodiment.

FIG. 1 illustrates the battery pack 13 in which multiple battery cells 11 are stored. For example, a total of 40 battery cells 11 (four rows of ten battery cells 11) are stored in a battery case 12. As illustrated, in each row, ten battery cells 11 are arranged upright in the arrangement direction (front-rear direction) and are coupled to one another in series by the first electrode coupling plates 31.

As will be described in detail below, the coupling structure 10 for the battery cells 11 according to this embodiment uses at least two types of electrode coupling plates, namely, the first electrode coupling plates 31 and the second electrode coupling plates 34 (see FIG. 3B). The first electrode coupling plates 31 or the second electrode coupling plates 34 are disposed between battery cells 11 adjacent to each other at least in the arrangement direction to couple the battery cells 11 in series, parallel, or series-parallel.

As illustrated in FIG. 1, four assembled batteries 14, each including ten series-coupled battery cells 11, are stored in the battery pack 13. In this case, each assembled battery 14 uses nine first electrode coupling plates 31. The first electrode coupling plates 31 are disposed between the adjacent battery cells 11 to achieve a series coupling structure of the assembled battery 14. The assembled batteries 14 are coupled to each other in series via bus bars 15 to form the high-voltage battery pack 13. The assembled batteries 14 are electrically coupled to a battery control unit (BCU) or a junction box, which is an electronic device (not illustrated). The assembled batteries 14 may be coupled to each other in parallel or series-parallel via the bus bars 15 depending on the voltage standard of the battery pack 13.

In this embodiment, the battery cells 11 and the first electrode coupling plates 31 are press-fitted into the battery case 12, so that positive electrode plates 21 and negative electrode plates 22 of the battery cells 11 are electrically coupled to first coupling terminals 33 of the first electrode coupling plates 31 with a desired contact pressure. The second electrode coupling plates 34 are also press-fitted into the battery case 12 and thereby being electrically coupled to the battery cells 11 with a desired contact pressure.

With this structure, in the coupling structure 10 for the battery cells 11, the battery cells 11, the first electrode coupling plates 31, and the second electrode coupling plates 34 can be electrically coupled to one another without using welding or bolt fastening. This simplifies the manufacturing process of the assembled batteries 14, reduces the component count and the materials, and thus reduces the manufacturing cost. Furthermore, in recycling the assembled battery 14, the assembled battery 14 can be disassembled by pulling out the battery cells 11 and other components, without needing to remove welded or bolt-fastened portions. Thus, the work time is significantly reduced.

The coupling structure 10 for the battery cells 11 is not limited to the structure having a press-fitting structure as long as the desired contact pressure is ensured to maintain good electrical coupling. For example, urging members (not illustrated) may be disposed between the battery case 12 and the battery cells 11 at both ends in the arrangement direction in each assembled battery 14 so as to press the battery cells 11 and the like from both sides in the arrangement direction.

For example, the battery pack 13 is disposed below the floor of a vehicle, such as an automobile or a train, and supplies electric power to a motor and various electrical components. In the field of automobiles, in recent years, electrical vehicles (EVs), hybrid electrical vehicles (HEVs), plug-in hybrid electrical vehicles (PHEVs), and the like have become widespread.

The coupling structure 10 for the battery cells 11 according to this embodiment may be used in a case other than the case where the battery cells 11 constituting the assembled battery 14 are electrically coupled to one another. For example, the coupling structure 10 may also be used to electrically couple individual battery cells 11 directly arranged in the battery case 12 of the battery pack 13 to one another. Besides these cases, the coupling structure 10 for the battery cells 11 according to this embodiment may be used to continuously and electrically couple multiple battery cells 11 arranged at least in the arrangement direction of the multiple battery cells 11 to one another.

As illustrated in FIG. 2, the battery cells 11 are, for example, secondary batteries, such as nickel hydrogen batteries or lithium ion batteries. Each battery cell 11 has, for example, a flat rectangular parallelepiped shape. The positive electrode plate 21 and the negative electrode plate 22 are provided at the opposite ends of the battery cell 11 in the long direction (left-right direction). The battery cells 11 are not limited to nickel-hydrogen batteries or lithium-ion batteries, and other batteries, such as all-solid-state batteries, that have the positive electrode plate 21 and the negative electrode plate 22 may also be used. The positive electrode plate 21 corresponds to a first electrode of the disclosure, and the negative electrode plate 22 corresponds to a second electrode of the disclosure.

As illustrated in FIG. 2, the positive electrode plate 21 and the negative electrode plate 22 are provided so as to protrude outward from a side surface 23A and a side surface 23B, respectively, of a housing 23 of the battery cell 11. The positive electrode plate 21 and the negative electrode plate 22 have a rectangular shape and extend in the top-bottom direction. The positive electrode plate 21 and the negative electrode plate 22 are located inward of the outer peripheries of the side surfaces 23A and 23B of the housing 23. Hence, there are steps 24 between the housing 23 and the positive electrode plate 21 and the negative electrode plate 22 at the ends of the battery cell 11 in the long direction.

This structure enables the positive electrode plate 21 and the negative electrode plate 22 of the battery cell 11 to be electrically coupled to the coupling terminals of the first electrode coupling plates 31 or the coupling terminals of the second electrode coupling plates 34 on both sides in the arrangement direction, in the arrangement direction of the battery cells 11 (front-rear direction).

As illustrated in FIG. 3A, the first electrode coupling plate 31 includes an insulating substrate 32 and the first coupling terminal 33 provided at a first end of the insulating substrate 32 in the long direction (left-right direction) thereof. The first electrode coupling plate 31 is disposed between battery cells 11 adjacent to each other in the arrangement direction of the battery cells 11 to couple the battery cells 11 in series. The first electrode coupling plate 31 fixes the battery cells 11 arranged upright in position and also serves as a separator.

The insulating substrate 32 is an insulating plate made of, for example, resin, such as a thermosetting resin. As described above, because the first electrode coupling plate 31 also serves as the separator, the insulating substrate 32 has substantially the same rectangular shape as the battery cell 11 in front view. The first coupling terminal 33 is, for example, a rectangular columnar bus bar. The bus bar is cut to a length substantially equal to the length of the insulating substrate 32 in the short direction (top-bottom direction) thereof, and is integrated with the insulating substrate 32 by resin molding.

As illustrated in FIG. 3A, the bus bar is exposed at at least side surfaces 32A and 32B of the insulating substrate 32 in the arrangement direction (front-rear direction). In the first electrode coupling plate 31, one bus bar is embedded in the insulating substrate 32 with parts thereof being exposed at two positions in the side surfaces 32A and 32B of the insulating substrate 32 to be used as the first coupling terminal 33.

With this structure, an arrangement region W1 in the first electrode coupling plate 31 where the first coupling terminal 33 is provided is thicker than the remaining part, i.e., a region W2, in the first electrode coupling plate 31, and serves as a projection 36. When the first electrode coupling plate 31 is disposed between adjacent battery cells 11, the projection 36, which is the arrangement region W1 where the first coupling terminal 33 is provided, engages with the steps 24 (see FIG. 2) in the battery cells 11. Thus, the battery cells 11 are prevented from moving in the long direction (left-right direction) thereof.

Because the first electrode coupling plate 31 has only the first coupling terminal 33, a projection 37 made solely of resin is provided at a second end of the insulating substrate 32 in the long direction thereof. In the first electrode coupling plate 31, the projection 37 has the same shape as the projection 36. With this structure, the first electrode coupling plate 31 has a substantially I-shaped cross-section in the long direction.

As illustrated in FIG. 3B, the second electrode coupling plate 34 includes the insulating substrate 32, the first coupling terminal 33 provided at the first end of the insulating substrate 32 in the long direction (left-right direction), and a second coupling terminal 35 provided at the second end of the insulating substrate 32 in the long direction thereof. The second electrode coupling plate 34 has the same structure as the first electrode coupling plate 31 except for the presence of the second coupling terminal 35 in the projection 37. The second coupling terminal 35 has the same structure as the first coupling terminal 33. The distance between the first coupling terminal 33 and the second coupling terminal 35 is such a distance that the first coupling terminal 33 and the second coupling terminal 35 can be electrically coupled to the positive electrode plate 21 and the negative electrode plate 22 of the battery cell 11, respectively, at the same time.

With this structure, the second electrode coupling plate 34 is disposed between battery cells 11 adjacent to each other in the arrangement direction of the battery cells 11 to couple the battery cells 11 in parallel. Similarly to the first electrode coupling plate 31, the second electrode coupling plate 34 also serves as a separator. The second electrode coupling plate 34 will be described with reference to the description of the first electrode coupling plate 31 as appropriate.

The first electrode coupling plate 31 and the second electrode coupling plate 34 both have the projections 36 and 37, but differ in the presence/absence of the bus bar in the projection 37. Because the first electrode coupling plate 31 and the second electrode coupling plate 34 can be molded with the same mold, the mold cost is reduced.

FIG. 4 is a top view illustrating a state in which the battery cells 11 are arranged upright and coupled in series via the first electrode coupling plates 31.

As illustrated in FIG. 4, in the coupling structure 10 for the battery cells 11 according to this embodiment, when the battery cells 11 are coupled in series, the battery cells 11 are arranged in the arrangement direction (front-rear direction) such that the positive electrode plates 21 and the negative electrode plates 22 alternate with each other, such that the positive electrode plate 21 and the negative electrode plate 22 of adjacent battery cells 11 face each other.

When the battery cells 11 are coupled in series, only the first electrode coupling plates 31 are used, and the first electrode coupling plates 31 are disposed between the adjacent battery cells 11. The first electrode coupling plates 31 are disposed between the battery cells 11 such that the first coupling terminals 33 are positioned alternately on the right side, left side, right side, left side, and so on. By rotating the first electrode coupling plate 31 by 180 degrees about a vertical axis, the position of the first coupling terminal 33 can be changed, so that the first electrode coupling plate 31 can be used in the series coupling.

As indicated with circles 41 and 42, the projections 36 and 37 of the first electrode coupling plates 31 fit between the positive electrode plates 21 and the negative electrode plates 22 of the adjacent battery cells 11. In other words, the battery cells 11 fit between the projections 36 and 37 of the first electrode coupling plates 31 and are fixed in position. With this structure, the battery cells 11 are unlikely to be displaced in the long direction of the battery cells 11 (left-right direction) by vibration of a vehicle or the like. Thus, contact between the first coupling terminals 33 of the first electrode coupling plates 31 and the positive electrode plates 21 and the negative electrode plates 22 of the battery cells 11 is maintained, and good electrical coupling between the battery cells 11 and the first electrode coupling plates 31 is maintained.

As described above, the battery cells 11 and the like are press-fitted into the battery case 12 and thus are pressed in the arrangement direction. This also helps maintain electrical coupling between the first coupling terminals 33 of the first electrode coupling plates 31 and the positive electrode plates 21 and the negative electrode plates 22 of the battery cells 11.

FIG. 5 is a top view illustrating a state in which the battery cells 11 are arranged upright and coupled in parallel via the second electrode coupling plates 34.

As illustrated in FIG. 5, in the coupling structure 10 for the battery cells 11 according to this embodiment, when the battery cells 11 are coupled in parallel, the battery cells 11 are arranged in the arrangement direction (front-rear direction) such that the positive electrode plates 21 of the adjacent battery cells 11 face each other, and the negative electrode plates 22 of the adjacent battery cells 11 face each other.

When the battery cells 11 are coupled in parallel, only the second electrode coupling plates 34 are used, and the second electrode coupling plates 34 are disposed between the adjacent battery cells 11. As illustrated in FIG. 5, the parallel coupling is achieved with multiple second electrode coupling plates 34 having the same structure. Thus, the manufacturing cost is significantly reduced.

As indicated with circles 51 and 52, the projections 36 of the second electrode coupling plates 34 fit between the positive electrode plates 21, and the projections 37 of the second electrode coupling plates 34 fit between the negative electrode plates 22 of the adjacent battery cells 11. In other words, the battery cells 11 fit between the projections 36 and 37 of the second electrode coupling plates 34 and are fixed in position. With this structure, the battery cells 11 are unlikely to be displaced in the long direction of the battery cells 11 (left-right direction) by vibration of a vehicle or the like. Thus, good electrical coupling between the battery cells 11 and the second electrode coupling plates 34 is maintained.

FIG. 6 is a top view illustrating a state in which the battery cells 11 are arranged upright and coupled in series-parallel via the first electrode coupling plates 31 and the second electrode coupling plates 34.

As illustrated in FIG. 6, in the coupling structure 10 for the battery cells 11 according to this embodiment, when the battery cells 11 are coupled in series-parallel, the first electrode coupling plates 31 and the second electrode coupling plates 34 are used. The series coupling structure described with reference to FIG. 4 and the parallel coupling structure described with reference to FIG. 5 are used in combination.

The series-parallel coupling of the battery cells 11 is achieved with two types of electrode coupling plates, namely, the first electrode coupling plates 31 and the second electrode coupling plates 34. Thus, the manufacturing cost is significantly reduced. In addition, because the battery cells 11 are fixed in position by the first electrode coupling plates 31 and the second electrode coupling plates 34, good electrical coupling between the battery cells 11, the first electrode coupling plates 31, and the second electrode coupling plates 34 is maintained.

As described above, the coupling structure 10 for the battery cells 11 according to this embodiment uses one type of the battery cells 11 in which, as illustrated in FIG. 2, the positive electrode plate 21 and the negative electrode plate 22 protrude outward from the side surfaces 23A and 23B, respectively, of the housing 23 of the battery cell 11. Because the facility for manufacturing the battery cells 11 is usually expensive, the manufacturing cost of the battery cells 11 is high. However, the coupling structure 10 for the battery cells 11 achieves the series, parallel, or series-parallel coupling structure with one type of battery cells 11 and two types of electrode coupling plates, namely, the first electrode coupling plates 31 and the second electrode coupling plates 34. Thus, the manufacturing cost is significantly reduced.

Next, a coupling structure 60 for battery cells 61 according to another embodiment of the disclosure will be described in detail with reference to the drawings. In the description of this embodiment, the same reference signs basically denote the same members, and repeated descriptions will be omitted. The front-rear direction in the drawings corresponds to the thickness direction of the battery cells 61, the left-right direction in the drawings corresponds to the transverse width direction of the battery cells 61, and the top-bottom direction in the drawings corresponds to the height direction of the battery cells 61. The front-rear direction is the direction in which the battery cells 61 are arranged (arrangement direction) and corresponds to the first direction in the disclosure. The left-right direction corresponds to the second direction in the disclosure.

The coupling structure 60 for the battery cells 61 according to this embodiment differs from the coupling structure 10 for the battery cells 11 described above in the structure of the battery cells. That is, a positive electrode plate 62 and a negative electrode plate 63 of the battery cell 61 are provided on inner side surfaces of a housing 64 of the battery cell 61. However, also in the coupling structure 60 for the battery cells 61 according to this embodiment, similarly to the coupling structure 10 for the battery cells 11, the battery cells 61 are coupled in series, parallel, or series-parallel with two types of electrode coupling plates, namely, a first electrode coupling plate 71 having only a first coupling terminal 73 and a second electrode coupling plate 72 having the first coupling terminal 73 and a second coupling terminal 74.

Hence, in the following description, the structures of the battery cell 61, the first electrode coupling plate 71, and the second electrode coupling plate 72 will be mainly described with reference to the description of the coupling structure 10 for the battery cells 11, which has been given with reference to FIGS. 1 to 6, as appropriate, and repeated description will be omitted.

Figure 7:
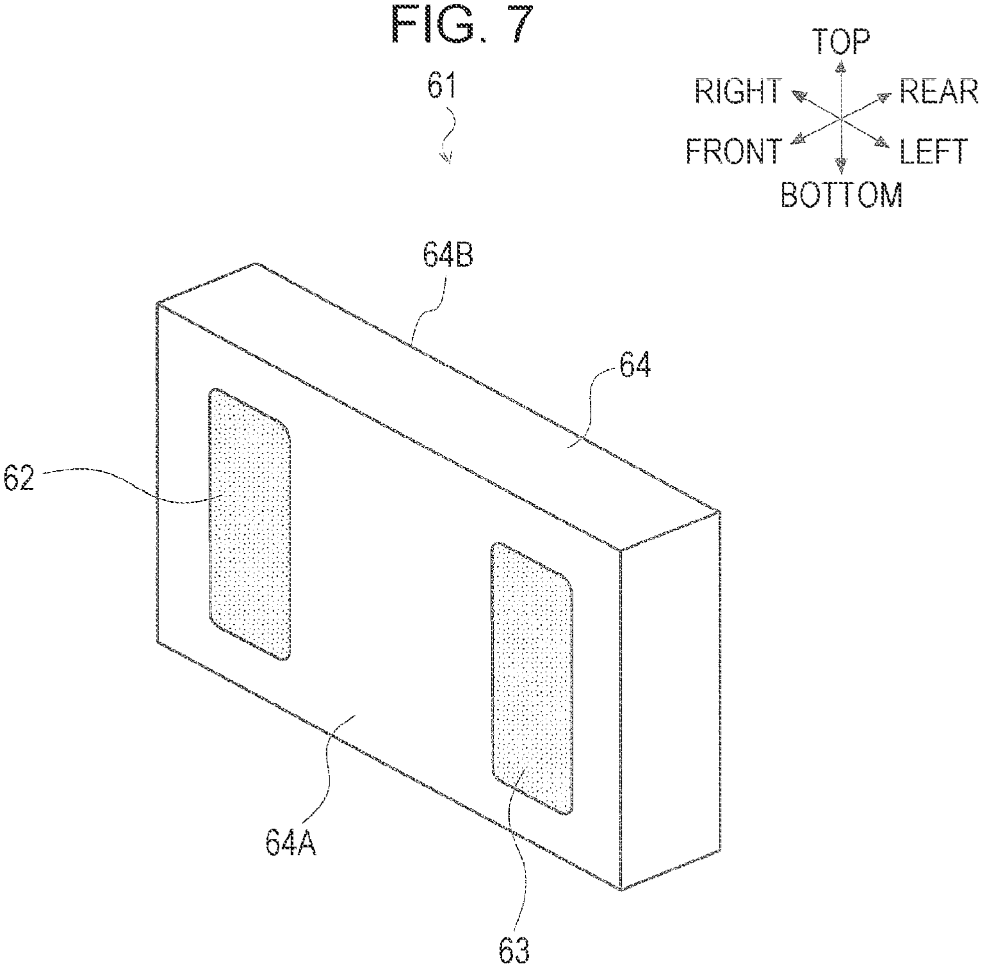
FIG. 7 is a perspective view of a battery cell used in a battery-cell coupling structure according to an embodiment of the disclosure.
Figure 8A:
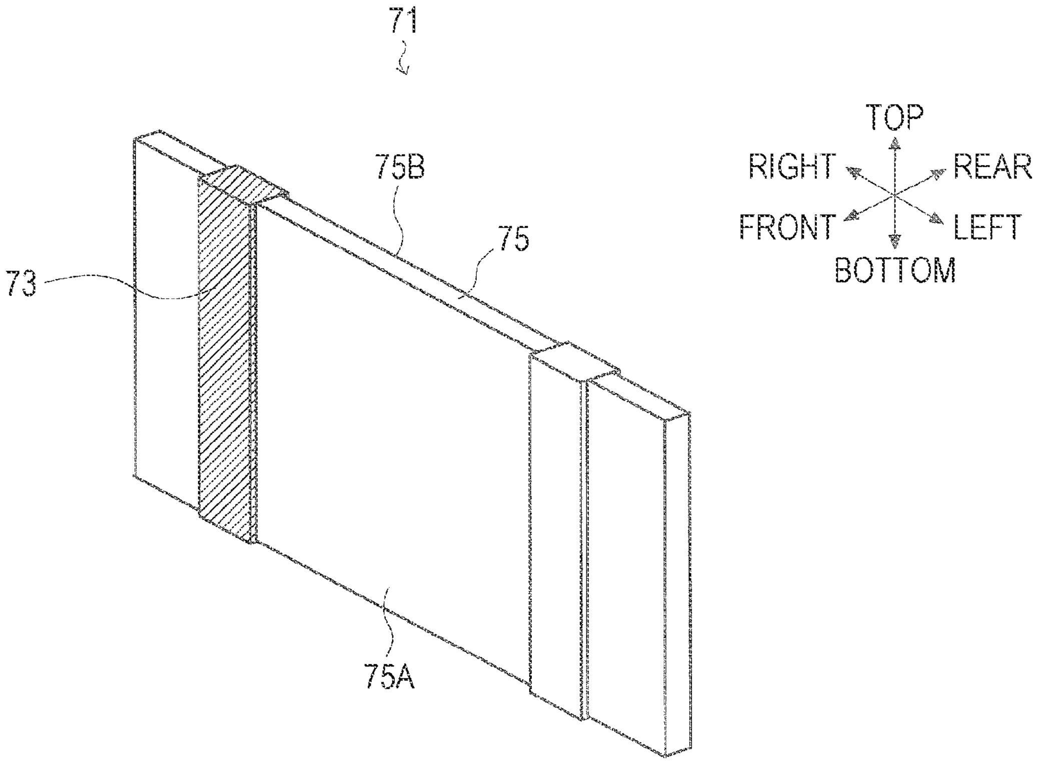
FIG. 8A is a perspective view of an electrode coupling plate used in the battery-cell coupling structure according to the embodiment of the disclosure.
Figure 8B:
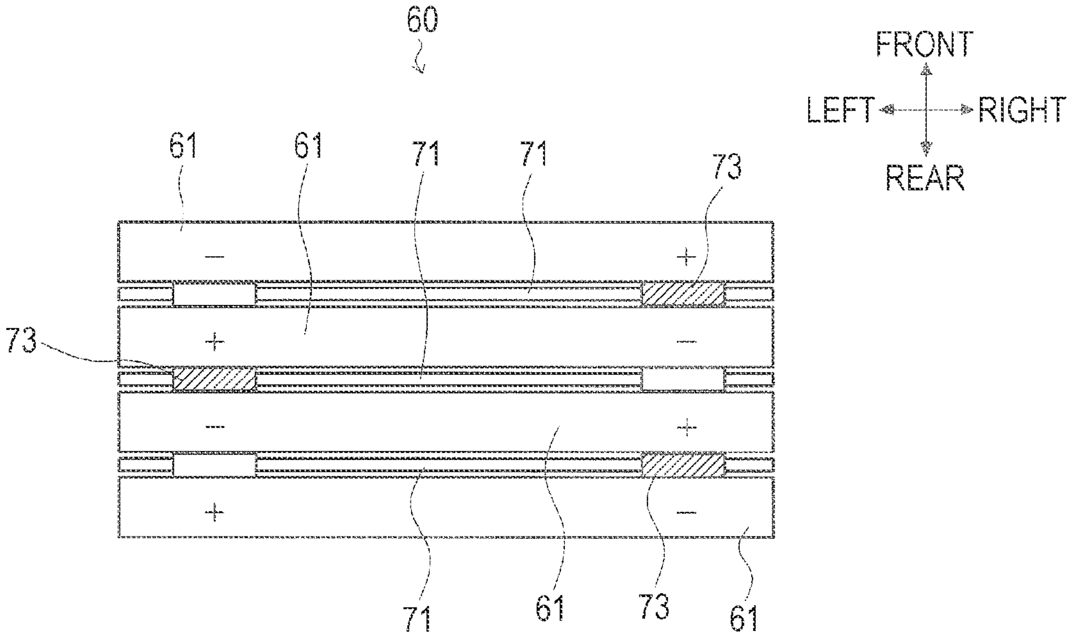
FIG. 8B is a top view of the battery-coupling structure according to the other embodiment of the disclosure.
Figure 9A:
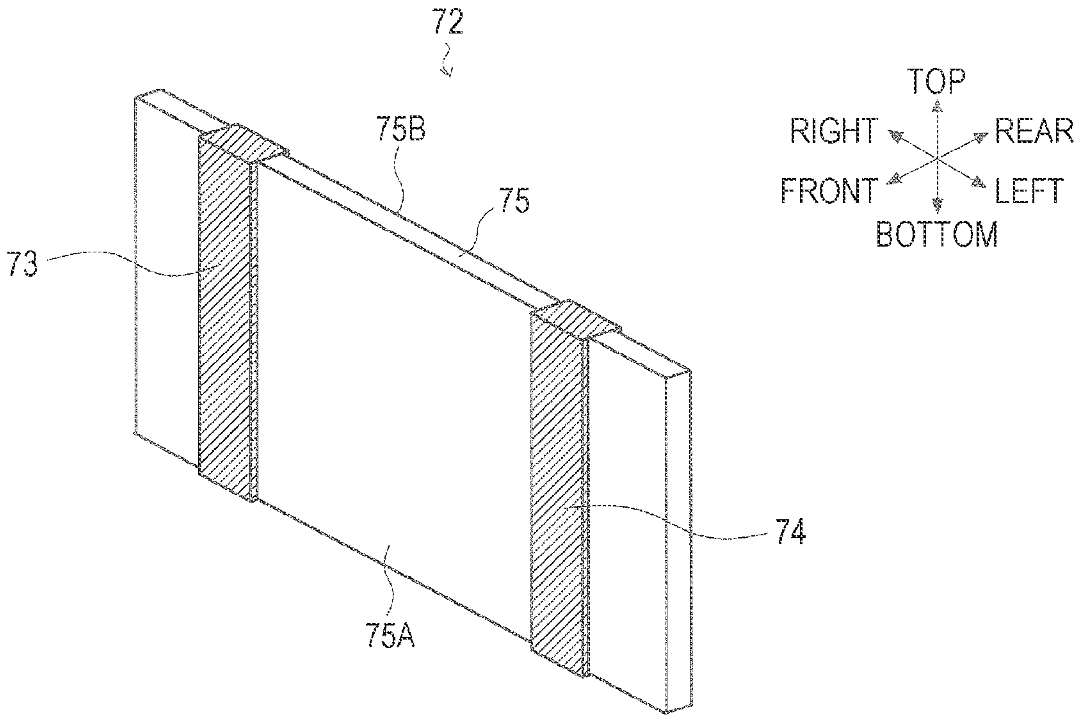
FIG. 9A is a perspective view of an electrode coupling plate used in the battery-cell coupling structure according to the embodiment of the disclosure.
Figure 9B:
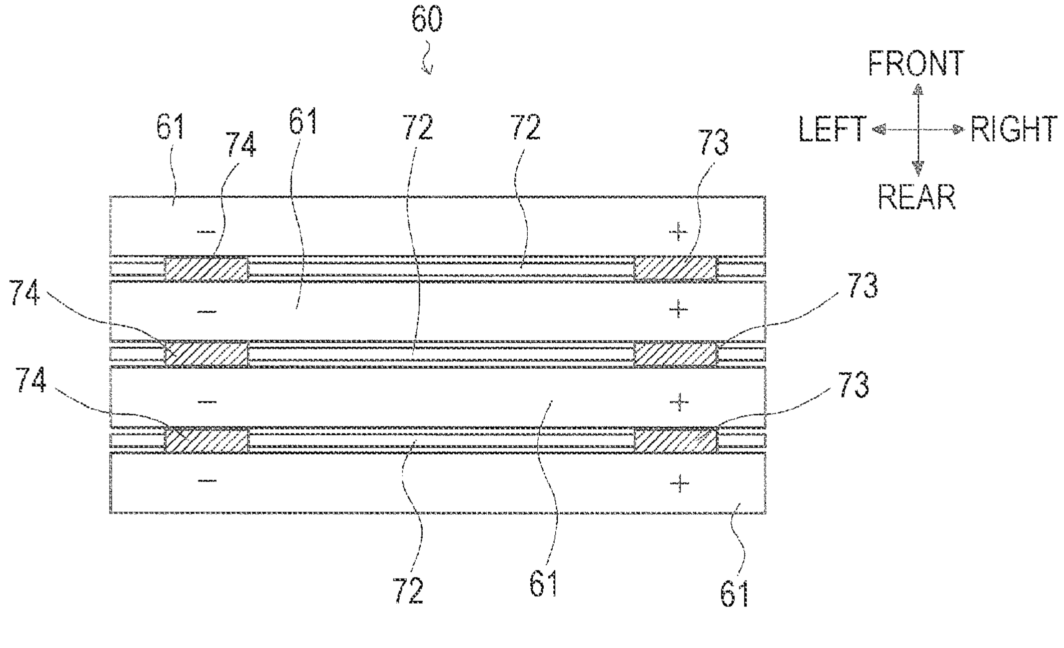
FIG. 9B is a top view of the battery-coupling structure according to the embodiment of the disclosure.

FIG. 7 is a perspective view of the battery cell 61 used in the coupling structure 60 for the battery cells 61 according to this embodiment. FIG. 8A is a perspective view of the first electrode coupling plate 71 used in the coupling structure 60 for the battery cells 61 according to this embodiment. FIG. 8B is a top view of the coupling structure 60 for the battery cells 61 according to this embodiment. FIG. 9A is a perspective view of the second electrode coupling plate 72 used in the coupling structure 60 for the battery cells 61 according to this embodiment. FIG. 9B is a top view of the coupling structure 60 for the battery cells 61 according to this embodiment.

As illustrated in FIG. 7, the battery cell 61 is the same battery as the battery cell 11. The positive electrode plate 62 and the negative electrode plate 63 of the battery cell 61 are provided on each of side surfaces 64A and 64B of the housing 64 of the battery cell 61. The positive electrode plate 62 has a substantially rectangular shape in front view and is provided on a first side of the battery cell 61 in the long direction (left-right direction) thereof. The negative electrode plate 63 has a substantially rectangular shape in front view and is provided on a second side of the battery cell 61 in the long direction (left-right direction) thereof. Although not illustrated, the positive electrode plate 62 and the negative electrode plate 63 are also provided at the side surface 64B of the housing 64, at positions corresponding to those at the side surface 64A. The positive electrode plate 62 corresponds to the first electrode of the disclosure, and the negative electrode plate 63 corresponds to the second electrode of the disclosure.

As illustrated in FIG. 8A, the first electrode coupling plate 71 includes an insulating substrate 75 and a first coupling terminal 73 provided on the first side of the insulating substrate 75 in the long direction (left-right direction) thereof. The first electrode coupling plate 71 is disposed between battery cells 61 adjacent to each other in the arrangement direction of the battery cells 61 to couple the battery cells 61 in series. The first electrode coupling plate 71 fixes the battery cells 61 arranged upright in position and also serves as a separator.

The insulating substrate 75 is an insulating plate made of, for example, resin, such as a thermosetting resin. As described above, because the first electrode coupling plate 71 also serves as the separator, the insulating substrate 75 has substantially the same rectangular shape as the battery cell 61 in front view. The first coupling terminal 73 is, for example, a plate-like bus bar. The bus bar is cut to a length substantially equal to the length of the insulating substrate 75 in the short direction (top-bottom direction) thereof, and is integrated with the insulating substrate 75 by resin molding.

As illustrated in FIG. 8A, the bus bar is exposed at at least side surfaces 75A and 75B of the insulating substrate 75 in the arrangement direction (front-rear direction). In the first electrode coupling plate 71, one bus bar is embedded in the insulating substrate 75 with parts being exposed from the side surfaces 75A and 75B of the first electrode coupling plate 71 so as to be used as the first coupling terminal 73.

In the first electrode coupling plate 71, the thickness of the bus bar in the arrangement direction (front-rear direction) is slightly larger than the thickness of the insulating substrate 75. The first coupling terminal 73 protrudes from the side surfaces 75A and 75B of the insulating substrate 75 to both sides in the arrangement direction by about several millimeters. Because the first electrode coupling plate 71 has only the first coupling terminal 73, a structure made of resin and protruding by about several millimeters is provided on a second side of the insulating substrate 75 in the long direction thereof.

FIG. 8B is a top view illustrating a state in which the battery cells 61 are arranged upright and coupled in series via the first electrode coupling plates 71.

As illustrated in FIG. 8B, in the coupling structure 60 for the battery cells 61 according to this embodiment, when the battery cells 61 are coupled in series, the battery cells 61 are arranged in the arrangement direction (front-rear direction) such that the positive electrode plates 62 and the negative electrode plates 63 alternate with each other such that the positive electrode plate 62 and the negative electrode plate 63 of adjacent battery cells 61 face each other.

As described above, because the first coupling terminal 73 protrudes in the arrangement direction from the side surfaces 75A and 75B of the insulating substrate 75, the first coupling terminal 73 easily comes into contact with the positive electrode plate 62 and the negative electrode plate 63 of the battery cells 61. When, for example, the battery cells 61 and the first electrode coupling plates 71 are press-fitted into the battery case 12, the battery cells 61 and the first electrode coupling plates 71 are pressed in the arrangement direction and are electrically coupled to each other. At this time, owing to the structure of the first coupling terminals 73, good contact state is easily maintained.

Also in the coupling structure 60 for the battery cells 61, similarly to the coupling structure 10 for the battery cells 11, the battery cells 61 are coupled in series with only the first electrode coupling plates 71. With this structure, the series coupling is achieved with multiple first electrode coupling plates 71 having the same structure.

Furthermore, the first electrode coupling plates 71, which have substantially the same size as the battery cells 61 in front view, can be disposed in the arrangement area for the battery cells 61, together with the battery cells 61. Thus, there is no need to change the size or the like of the insulating substrates 75 depending on the size of the battery case 12 or a frame (not illustrated) of the assembled battery 14. Thus. the manufacturing cost is significantly reduced.

As illustrated in FIG. 9A, the second electrode coupling plate 72 includes the insulating substrate 75, the first coupling terminal 73 provided at the first end of the insulating substrate 75 in the long direction (left-right direction) thereof, and a second coupling terminal 74 provided at the second end of the insulating substrate 75 in the long direction thereof. The second electrode coupling plate 72 has the same structure as the first electrode coupling plate 71 except for the presence of the second coupling terminal 74. The second coupling terminal 74 has the same structure as the first coupling terminal 73.

The second electrode coupling plate 72 is disposed between battery cells 61 adjacent to each other in the arrangement direction of the battery cells 61 to couple the battery cells 61 in parallel. Similarly to the first electrode coupling plate 71, the second electrode coupling plate 72 also serves as a separator. Because the first electrode coupling plate 71 and the second electrode coupling plate 72 can be molded with the same mold, the mold cost is reduced. The second electrode coupling plate 72 will be described with reference to the description of the first electrode coupling plate 71 as appropriate.

FIG. 9B is a top view illustrating a state in which the battery cells 61 are arranged upright and coupled in parallel via the second electrode coupling plates 72.

As illustrated in FIG. 9B, in the coupling structure 60 for the battery cells 61 according to this embodiment, when the battery cells 61 are coupled in parallel, the battery cells 61 are arranged in the arrangement direction (front-rear direction) such that the positive electrode plates 62 of the adjacent battery cells 61 face each other, and the negative electrode plates 63 of the adjacent battery cells 61 face each other.

When the battery cells 61 are coupled in parallel, only the second electrode coupling plates 72 are used, and the second electrode coupling plates 72 are disposed between adjacent battery cells 61. As illustrated in FIG. 9B, the parallel coupling is achieved with multiple second electrode coupling plates 72 having the same structure. Thus, the manufacturing cost is significantly reduced.

As described above, because the first coupling terminal 73 and the second coupling terminal 74 protrude in the arrangement direction from the side surfaces 75A and 75B of the insulating substrate 75, the first coupling terminal 73 and the second coupling terminal 74 easily come into contact with the positive electrode plates 62 and the negative electrode plates 63 of the battery cells 61. When, for example, the battery cells 61 and the second electrode coupling plates 72 are press-fitted into the battery case 12, the battery cells 61 and the second electrode coupling plates 72 are pressed in the arrangement direction and are electrically coupled to each other. At this time, owing to the structures of the first coupling terminal 73 and the second coupling terminal 74, good contact state is easily maintained.

Also in the coupling structure 60 for the battery cells 61, similarly to the coupling structure 10 for the battery cells 11, the series-parallel coupling structure is achieved with the first electrode coupling plates 71 and the second electrode coupling plates 72. Although not illustrated, as described with reference to FIG. 8B, at portions where the battery cells 61 arranged in the arrangement direction are coupled in series, the adjacent cells 61 are electrically coupled to each other by the first electrode coupling plates 71. Meanwhile, as described with reference to FIG. 9B, at portions where the battery cells 61 are coupled in parallel, the adjacent cells 61 are electrically coupled to each other by the second electrode coupling plates 72.

The series-parallel coupling of the battery cells 61 is achieved with two types of electrode coupling plates, namely, the first electrode coupling plates 71 and the second electrode coupling plates 72. Thus, the manufacturing cost is significantly reduced.

As described above, the coupling structure 60 for the battery cells 61 according to this embodiment also achieves the series, parallel, or series-parallel coupling structure with one type of the battery cells 61, illustrated in FIG. 7, and two types of electrode coupling plates, namely, the first electrode coupling plates 71 and the second electrode coupling plates 72. Thus, the manufacturing cost is significantly reduced.

In addition, the battery cells 61 and the first electrode coupling plates 71 and the second electrode coupling plates 72 can be electrically coupled to one another without using welding or bolt fastening. This simplifies the manufacturing process of the assembled batteries 14, reduces the component count and the materials, and thus reduces the manufacturing cost. Furthermore, in recycling the assembled battery 14, the assembled battery 14 can be disassembled by pulling out the battery cells 11 and other components, without needing to remove welded or bolt-fastened portions. Thus, the work time is significantly reduced.

In this embodiment, the battery cells 11 and 61 are arranged upright on, for example, the bottom surface of the battery case 12. Although the cases have been described where the battery cells 11 and 61 arranged at least in the arrangement direction (front-rear direction) are coupled in series, parallel, or series-parallel with the coupling structures 10 and 60, the disclosure is not limited to these cases. For example, the battery cells 11 and 61 arranged in a laid manner on the bottom surface of the battery case 12 and stacked in the height direction of the battery case 12 may be coupled in series, parallel, or series-parallel with the coupling structures 10 and 60, by arranging the first electrode coupling plates 31 and 71 and the second electrode coupling plates 34 and 72 between the battery cells 11 and 61 adjacent to each other in the height direction.

As described with reference to FIGS. 4 to 6, in the coupling structure 10 for the battery cells 11, the cases have been described where the housings 23 of the battery cells 11 fit between the projections 36 and 37 of the first electrode coupling plates 31 and the second electrode coupling plates 34 in the long direction (left-right direction). However, the disclosure is not limited to these cases. For example, the first electrode coupling plates 31 and the second electrode coupling plates 34 may be elongated further in the long direction (left-right direction) so as to accommodate the battery cells 11 including the positive electrode plates 21 and the negative electrode plates 22 between the projections 36 and 37. In this case, the first coupling terminal 33 and the second coupling terminal 35 are exposed at the inner side surfaces 36A and 37A (see FIGS. 3A and 3B) of the projections 36 and 37. The first coupling terminal 33 and the second coupling terminal 35 may be electrically coupled to the positive electrode plate 21 and the negative electrode plate 22 disposed on the inner sides of the projections 36 and 37. Various other modifications can be made without departing from the gist of the disclosure.

A battery-cell coupling structure according to an embodiment of the disclosure includes a first electrode coupling plate having a first coupling terminal, and a second electrode coupling plate having the first coupling terminal and a second coupling terminal. When battery cells adjacent to each other in the arrangement direction are coupled in series, the first electrode coupling plate is used. When the adjacent battery cells are coupled in parallel, the second electrode coupling plate is used. When the battery cells arranged in the arrangement direction are coupled in series-parallel, the first electrode coupling plate and the second electrode coupling plate are used. With this structure, the battery cells arranged at least in the arrangement direction can be coupled to each other in series, parallel, or series-parallel with two types of electrode coupling plates, namely, the first electrode coupling plate and the second electrode coupling plate. Although the facility for manufacturing the battery cells is expensive, and the manufacturing cost of the battery cells is high, by achieving the above-described three types of coupling structures with the first electrode coupling plate, the second electrode coupling plate, and one type of battery cells, the manufacturing cost is significantly reduced. Furthermore, because a battery pack can be formed by stacking the battery cells, the first electrode coupling plates, and the second electrode coupling plates, the manufacture of the battery pack is simplified, and the manufacturing cost thereof is reduced. In addition, because the electrodes are fixed without using welding or bolt fastening, the assembled battery can be easily disassembled for recycling.

The invention claimed is:

1. A battery-cell coupling structure comprising:

battery cells arranged in a first direction;

a first electrode coupling plate comprising an insulating substrate and a first coupling terminal provided at a first end of the insulating substrate in a second direction orthogonal to the first direction; and a second electrode coupling plate comprising the insulating substrate, the first coupling terminal, and a second coupling terminal provided at a second end of the insulating substrate in the second direction, the battery-cell coupling structure being configured to electrically couple the battery cells to each other, wherein each of the battery cells comprises a first electrode provided at a first end in the second direction and a second electrode provided at a second end in the second direction, the first electrode coupling plate is disposed between the battery cells adjacent to each other in the first direction to couple the battery cells in series, the second electrode coupling plate is disposed between the battery cells adjacent to each other in the first direction to couple the battery cells in parallel, and the battery cells are coupled in series, parallel, or series-parallel with one or both of the first electrode coupling plate and the second electrode coupling plate.

2. The battery-cell coupling structure according to claim 1, wherein the first electrode and the second electrode are provided on both side surfaces of each of the battery cells in the first direction.

3. The battery-cell coupling structure according to claim 2, wherein a distance between the first coupling terminal and the second coupling terminal of the second electrode coupling plate is such a distance that the second coupling terminal is in contact with the second electrode when the first coupling terminal is in contact with the first electrode.

4. The battery-cell coupling structure according to claim 3, wherein an arrangement region in the first electrode coupling plate where the first coupling terminal is provided protrudes in the first direction of the first electrode coupling plate, and arrangement regions in the second electrode coupling plate where the first coupling terminal and the second coupling terminal are provided protrude in the first direction of the second electrode coupling plate.

5. The battery-cell coupling structure according to claim 1, wherein the first electrode and the second electrode protrude outward from each of the battery cells in the second direction.

6. The battery-cell coupling structure according to claim 5, wherein a distance between the first coupling terminal and the second coupling terminal of the second electrode coupling plate is such a distance that the second coupling terminal is in contact with the second electrode when the first coupling terminal is in contact with the first electrode.

7. The battery-cell coupling structure according to claim 5, wherein an arrangement region in the first electrode coupling plate where the first coupling terminal is provided protrudes in the first direction of the first electrode coupling plate, and arrangement regions in the second electrode coupling plate where the first coupling terminal and the second coupling terminal are provided protrude in the first direction of the second electrode coupling plate.

* * * * *